United States Patent
Harper et al.

(10) Patent No.: US 8,175,534 B2
(45) Date of Patent: May 8, 2012

(54) RF-AWARE PACKET FILTERING IN RADIO ACCESS NETWORKS

(75) Inventors: Matthew H. Harper, Salem, NH (US); Sanil Kumar Puthiyandyil, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 858 days.

(21) Appl. No.: 10/934,166

(22) Filed: Sep. 3, 2004

(65) Prior Publication Data

US 2006/0050668 A1    Mar. 9, 2006

(51) Int. Cl.
H04M 1/00    (2006.01)

(52) U.S. Cl. ............ 455/67.11; 455/567; 455/561; 455/209; 455/458; 370/352

(58) Field of Classification Search ............ 370/229, 370/230, 235, 401, 328, 339, 265, 400, 466, 370/467, 278, 282, 338; 709/221, 220, 223, 709/245, 222, 225, 227, 218; 455/453
See application file for complete search history.

(56) References Cited

U.S. PATENT DOCUMENTS

| | | | |
|---|---|---|---|
| 5,940,762 A * | 8/1999 | Lee et al. .................. 455/442 |
| 5,995,832 A * | 11/1999 | Mallinckrodt .............. 455/427 |
| 6,553,217 B1 * | 4/2003 | Kundorf .................... 455/406 |
| 6,748,247 B1 * | 6/2004 | Ramakrishnan et al. ...... 455/574 |
| 6,781,972 B1 * | 8/2004 | Anderlind et al. ........... 370/329 |
| 7,154,868 B1 * | 12/2006 | Sharma et al. .............. 370/331 |
| 7,289,480 B2 * | 10/2007 | Lundstrom et al. .......... 370/338 |
| 2002/0105970 A1 * | 8/2002 | Shvodian .................. 370/468 |
| 2003/0221016 A1 * | 11/2003 | Jouppi et al. ............... 709/245 |
| 2003/0225887 A1 * | 12/2003 | Purnadi et al. ............. 709/227 |
| 2003/0235171 A1 | 12/2003 | Lundstrom et al. |
| 2004/0022212 A1 * | 2/2004 | Chowdhury et al. ......... 370/329 |
| 2004/0022258 A1 * | 2/2004 | Tsukada et al. ............. 370/401 |
| 2004/0109426 A1 * | 6/2004 | Veerepalli et al. .......... 370/335 |
| 2004/0120283 A1 * | 6/2004 | Rezaiifar et al. ............ 370/328 |
| 2004/0151155 A1 | 8/2004 | Jouppi |
| 2004/0152422 A1 * | 8/2004 | Hoglund et al. ........... 455/67.11 |
| 2004/0203825 A1 * | 10/2004 | Daniel et al. .............. 455/452.1 |
| 2004/0203894 A1 * | 10/2004 | Watanabe et al. .......... 455/456.1 |
| 2004/0205247 A1 | 10/2004 | Ahn |
| 2005/0003856 A1 * | 1/2005 | Jang et al. ................. 455/553.1 |
| 2005/0025116 A1 * | 2/2005 | Chen et al. ................. 370/349 |
| 2005/0044138 A1 * | 2/2005 | Albert et al. ............... 709/203 |
| 2005/0089008 A1 * | 4/2005 | Choo et al. ................ 370/349 |
| 2005/0129013 A1 * | 6/2005 | Rasanen .................... 370/389 |
| 2005/0136884 A1 * | 6/2005 | Reidelsturz et al. ......... 455/403 |
| 2005/0149754 A1 * | 7/2005 | Rasanen .................... 713/201 |
| 2005/0159167 A1 * | 7/2005 | Hakalin et al. ............. 455/453 |
| 2005/0232184 A1 * | 10/2005 | Borella .................... 370/328 |

\* cited by examiner

*Primary Examiner* — Michael Thier
*Assistant Examiner* — Julio Perez
(74) *Attorney, Agent, or Firm* — Wilmer Cutler Pickering Hale and Dorr LLP

(57) ABSTRACT

Methods and systems are provided for filtering packets in a wireless communication system in the to-mobile subscriber direction. This filtering is at least in part based on RF circuit state information. For example, a packet filter is used that either permits or denies packets from reaching a mobile subscriber based on whether there is already an established RF circuit to provide packets to the mobile subscriber. Alternatively, or in addition, the packet filter may consider the history of circuit state transitions associated with a particular mobile subscriber, the percentage (or aggregate number) of available airlink resources that are currently in use, and/or the length of time associated with the dormancy of a mobile subscriber's RF connection. In various embodiments, the packet filter may cause one or more packets to be sent to a mobile subscriber using a special data channel that does not require the establishment of an RF circuit.

38 Claims, 8 Drawing Sheets

RF-AWARE PACKET FILTERING IN RADIO ACCESS NETWORKS

FIELD OF THE INVENTION

The present invention relates to wireless communication systems. More particularly, this invention relates to wireless communication systems that employ RF-aware packet filtering in the to-mobile subscriber direction.

BACKGROUND OF THE INVENTION

Wireless communication systems and networks are used in connection with many applications, including, for example, satellite communications systems, portable digital assistants (PDAs), laptop computers, and portable communication devices (e.g., cellular telephones). One significant benefit that users of such applications obtain is the ability to connect, or stay connected to, a network (e.g., the Internet) as long as the user is within range of such a wireless communication system.

Current wireless communication systems use either, or a combination of, circuit switching and packet switching in order to provide mobile data services to a mobile subscriber. Generally speaking, with circuit-based approaches, wireless data is carried by establishing a dedicated (and uninterrupted) connection between the sender and recipient of data using a series of circuits controlled by switches or exchanges. This direct connection is set up between the parties involved in a call by exchanging signaling messages which contain the parties' addresses and request the establishment of a physical switching path. Once the direct connection is set-up, it is maintained for as long as the sender and receiver have data to exchange. The establishment of such a direct and dedicated switching path results in a fixed share of network resources being tied up, with no one else being able to make use of them until the connection is closed. When the physical connection between the sender and the receiver is no longer desired, it is torn-down and the network resources are allocated to other users as necessary.

While circuit-based approaches are generally well suited for applications requiring constant bandwidth and high quality of service (QoS), they are generally inefficient for low-bandwidth and "bursty" applications because the time between signal transmission is not used by any other calls (due to the dedicated nature of the call line). In addition, with circuit switching, the setup time can be considerable, and costs can be high for a user because there are generally usage charges even when the dedicated connection is not being used to transmit data. Most current wireless communications systems, such as those based on technologies including code-divisional multiple access (CDMA), global system mobile communication (GSM), and time division multiple access (TDMA), use radio frequency (RF) circuit connections at least for connecting a mobile subscriber to the system's radio access network (as explained below).

Packet-based approaches, on the other hand, do not permanently assign transmission resources to a given call, and do not require the set-up and tear-down of physical connections between a sender and receiver of data. In general, data to be transmitted in packet-based approaches is "packetized," where the data is divided into separate packets of information, and each packet receives "header" information that may provide, for example, source information, destination information, information regarding the number of bits in the packet, priority information, and security information. The packets are then routed to a destination independently of the other packets of information, potentially along diverse routes. In addition to headers, these packets generally also include "trailers" which are used to provide redundancy checks (e.g., a cyclic redundancy code for detecting errors). Once these packets arrive at their ultimate destination, assuming they did not arrive in sequential order, they are reconfigured in the original order to provide the data that was being transmitted.

One advantage of packet-based approaches is that they use bandwidth on a circuit only as needed, allowing other transmissions to pass through the lines in the interim. Accordingly, packet-based approaches are often preferable to circuit-based approaches for applications that transmit data in bursts (e.g., interactive applications in which a user periodically enters data to be transmitted using a keyboard or other input device). In such applications, packet-based approaches make it possible to interleave multiple transmissions (e.g., from several terminals) onto the transmission channel, rather than the channel being idle between the periodic data inputs of a user. Additionally, because a plurality of paths exists from the sender to the receiver, alternate routes may be used to convey the packets in the event of a failure or congestion of a given route. Three major drawbacks to packet-based approaches include the burden of establishing routing for each packet (unlike the circuit switch architecture, which uses fixed routing for any given call), nondeterministic QoS, and the requirement for additional bandwidth because each packet must contain the necessary header information which conveys the routing requirements of that packet.

FIG. 1 is a simplified illustration of one embodiment of a conventional wireless communication system 100 in which the present invention may be implemented. As the main features of wireless communication system 100 are well know to those versed in the art, only a brief description of its components will now be provided. Further explanation will be provided below as necessary to aid the understanding of the principles of the present invention described herein.

As shown, wireless communication system 100 includes a mobile subscriber (MS) 102. MS 102, which is also known in the art as a mobile station, mobile node, and by other names, may be any suitable device that is capable of communicating with a wireless network. For example, MS 102 may be a cellular telephone or laptop computer with a wireless modem.

In wireless communication system 100, MS 102 communicates with a radio access network (RAN) 104 over an air interface or airlink 103 using an established RF circuit or RF data channel (as is well known in the art). RAN 104 includes a base station or base transceiver station (BTS) 106, a base station controller (BSC) 108, and a packet control function (PCF) 110 (which may be co-located with BSC 108, although this is not required). BTS 106 is used for transmitting and receiving RF signals from MS 102 by converting digital data into radio signals and vice versa. Although not shown, BTS 102 generally has an associated radio tower or antenna that it uses to communicates with various mobile subscribers, such as MS 102, using respective radio links. In particular, BTS 106 communicates with MS 102 through the modulation and transmission of sets of forward signals, while BTS 106 receives and demodulate sets of reverse signals from MS 102 that are engaged in a wireless network activity (e.g., a telephone call, Web browsing session, etc.).

BSC 108, which is generally in fixed line communication with BTS 106, is used for managing the radio resources of BTS 106. For example, as known in the art, BSC 108 may handle radio-channel setup, frequency hopping, and handovers. Moreover, BSC 108 provides an interface between the radio frequency (RF) traffic arriving from the antennas of BTS 106 and mobile switching center (MSC) 112, which connects to a public switched telephone network (PSTN) 114. Meanwhile, PCF 110 is used to route IP packet data between MS 102 (when within range of BTS 106) and a packet data service node (PDSN) 116. PDSN 116, in turn, is used to provide access to one or more internet protocol (IP) networks such as IP network 118. It will be understood that IP network 118 may be, for example, the Internet, intranets, applications servers, or corporate virtual private networks (VPNs). In this manner, PDSN 116 acts as an access gateway. Although not shown in FIG. 1, PDSN 116 generally also acts as a client for Authentication, Authorization, and Accounting (AAA) AAA servers. As known in the art, AAA servers are used to authenticate and authorize MS 102 before access is granted to IP network 118.

An important consideration for wireless communication system 100, which uses a circuit oriented approach in connecting MS 102 (and other mobile subscribers which are not shown) to one or more BTSs (such as BTS 106) of RAN 104, is how to efficiently utilize the available RF resources (e.g., the RF spectrum allocated for use by a wireless provider). As known by those skilled in the art, it is generally very costly to establish/disconnect the necessary RF circuits to transmit data to and from MS 102. Thus, for efficiency reasons, once a circuit has been established, it is typically kept in an established state consuming precious RF bandwidth until sufficient time passes without data transfer (e.g., at least a few tens of seconds). Following this time period, RAN 104 may decide that the session is "dormant" and permit the portion of the RF spectrum reserved for the circuit to be reallocated to another mobile subscriber. It will be understood by persons versed in the art that the term dormant, as used herein, refers to a situation where a logic path exists for transferring data between MS 102 and IP network 118, but there is no allocated RF circuit. For example, once a certain period of time has passed without data transfer between MS 102 and IP network 118, the RF circuit is de-allocated, where the data session still exists but the RF data channel has been released and is available for use by other mobile subscribers. On the other hand, a session is said to be active when there is an allocated RF circuit for transferring data between MS 102 and IP network 118.

In wireless systems using circuit based connections to mobile subscribers such as described above, the worst case scenario in terms of RF resource usage is for a single packet (or a few isolated packets) to be sent to a large number of mobile subscribers (e.g., MS 102) of wireless communication system 100 during a relatively short period of time. This would require an RF data circuit to be established for each MS 102 in order to pass the packet, and then these circuits would remain idle until RAN 104 decides to de-allocate the RF resources and make the sessions dormant (e.g., due to lack of traffic data). Unfortunately, the traffic patterns observed on the Internet and other existing IP networks often have these properties. For example, these traffic patterns are often observed when IP address scans are being performed (e.g., by a malevolent computer program seeking to locate vulnerable computer systems), or when ping packets or ICMP echo requests are being sent to multiple mobile subscribers.

One common technique that is often used to prevent imprudent activation of RF circuits is to apply packet filters in the direction of IP network 118 to MS 102. As is well known in the art, packet filters generally use a set of selectors (e.g., fields in the header of the traversing packets) to determine whether to allow packets to pass to MS 102.

While existing packet filters are able to take into account several factors when deciding whether to permit a packet to pass, they do not take into account RF circuit state information (as defined below). For example, such filters do not consider whether an RF circuit has already been established for a given MS 102, or the past history of RF circuit connections to MS 102. As a result, existing packet filters are not able, for example, to permit or deny the passage of a single packet on the basis of an RF circuit already being established, where the passage of such a packet would not present a significant burden on wireless communication system 100. Additionally, for example, existing packet filters are not able to permit or deny the passage of such a packet based on past circuit state transitions, general availability of RF resources in wireless communication system 100, and other similar circuit state information that would be beneficial to consider.

Accordingly, it is desirable to provide systems and methods for filtering packets in the to-MS direction where the filtering is at least in part based on RF circuit state information.

SUMMARY OF THE INVENTION

Methods and systems are provided for filtering packets in the direction of a mobile subscriber, where the filtering is at least in part based on RF circuit state information. According to the invention, this circuit state information may include, for example, whether there is already an established RF circuit to provide packets to the a mobile subscriber, the history of circuit state transitions associated with a mobile subscriber, the percentage (or aggregate number) of currently available airlink (RF) resources, and/or the length of time associated with the dormancy of a mobile subscriber's RF connection. Moreover, in various embodiments of the present invention, the packet filter being used may cause one or more packets to be sent to a mobile subscriber using a special data channel that does not require the establishment of an RF circuit.

In one embodiment, the invention provides a wireless communication system that includes a radio access network, a network access server for providing an interface between the radio access network and an IP network, and a data packet filter for selectively permitting the passage of a data packet from the IP network to the radio access network at least in part based on RF circuit state information concerning a mobile subscriber that communicates with the radio access network using an airlink.

In another embodiment, the invention provides a wireless communication system that includes a radio access network, a network access server for providing an interface between the radio access network and an (IP) network, and a data packet filter for selectively permitting the passage of a data packet from the IP network to the radio access network at least in part based on a determined usage of available RF resources in the wireless communication system.

According to yet another embodiment, the invention provides a wireless communication system that includes a radio access network, a network access server for providing an interface between the radio access network and an (IP) network, and a data packet filter for selectively marking and permitting the passage of a data packet from the IP network to the radio access network, where the marking results in the data packet being sent to a mobile subscriber using a special data channel.

According to still another embodiment, the invention provides a method for filtering data packets in a wireless communication system that includes a radio access network, a network access server, and an IP network, where the method includes receiving one or more data packets destined for a mobile subscriber from the IP network, determining RF circuit state information concerning at least one of the mobile subscriber and the wireless communication system, and permitting or denying the passage of the one or more packets from the IP network to the mobile subscriber based at least in part based on the determined RF circuit state information.

In an additional embodiment, the invention provides a method for filtering data packets in a wireless communication system that includes a radio access network, a network access server, and an IP network, where the method includes receiving one or more data packets destined for a mobile subscriber from the IP network, determining whether the mobile subscriber is RF-dormant, and when the mobile subscriber is RF-dormant, marking the one or more data packets from the IP network, the marking resulting in the one or more data packets being sent to the mobile subscriber using a special data channel.

According to another embodiment, the invention provides a wireless communication system that includes means for receiving one or more data packets destined for a mobile subscriber from an IP network, means for determining RF circuit state information concerning at least one of the mobile subscriber and the wireless communication system, and means for permitting or denying the passage of the one or more packets from the IP network to the mobile subscriber based at least in part on the determined RF circuit state information.

In yet another embodiment, the invention provides a data packet filter for use in a wireless communication system, the data packet filter receiving one or more data packets from an IP network and, based at least in part on RF circuit state information concerning at least one of a mobile subscriber and the wireless communication system, permitting or denying the passage of the one or more packets from the IP network to the mobile subscriber.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout, and in which.

DETAILED DESCRIPTION OF THE INVENTION

Methods and systems are provided for filtering packets in a wireless communication system in the to-MS direction, where the filtering is at least in part based on RF circuit state information. It will be understood that certain features which are well known in the art are not described in detail in order to avoid complication of the subject matter of the present invention.

Figure 1:
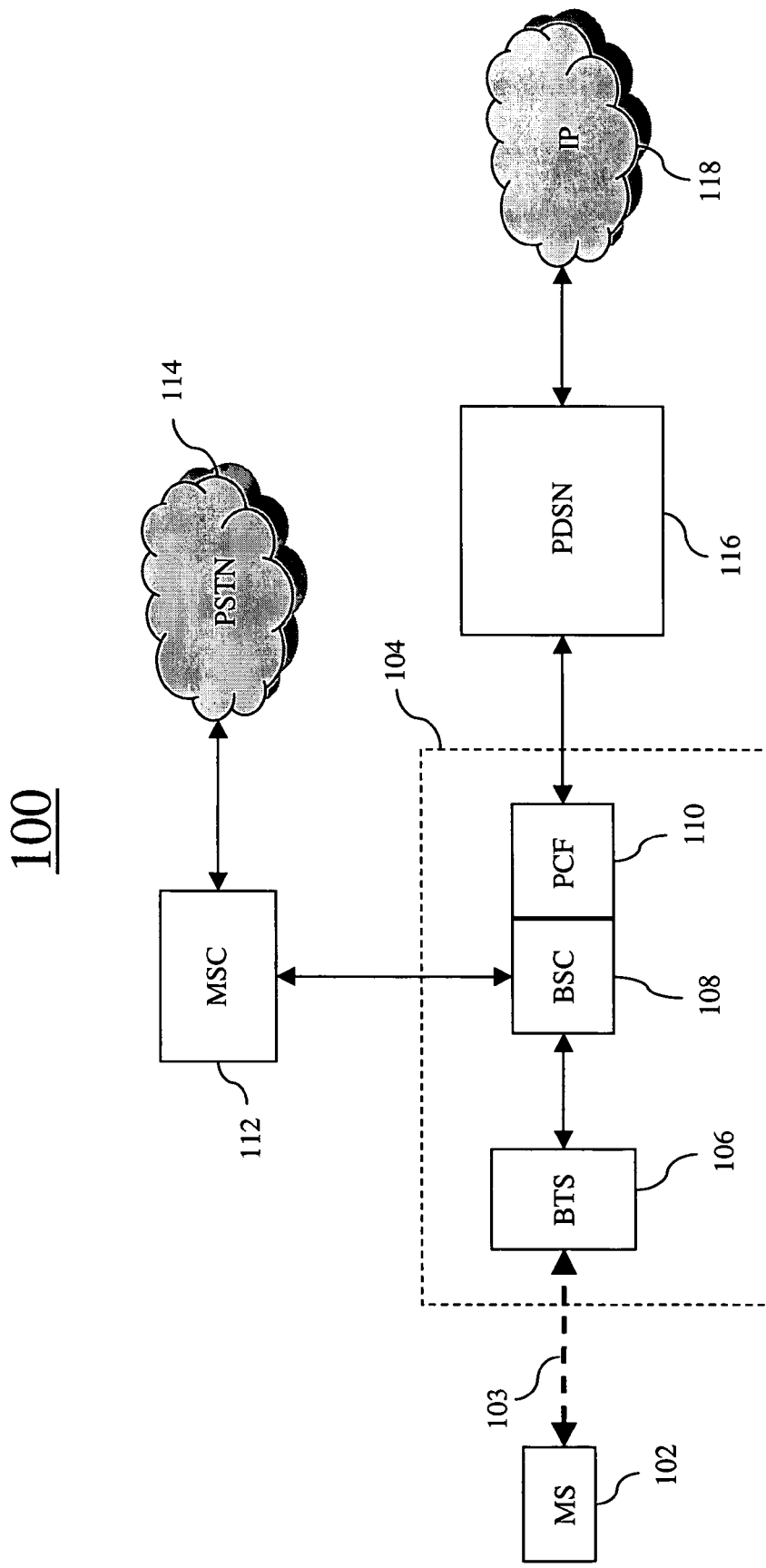
FIG. 1 is a simplified illustration of a conventional wireless communication system 100 in which the present invention may be implemented.
Figure 2:
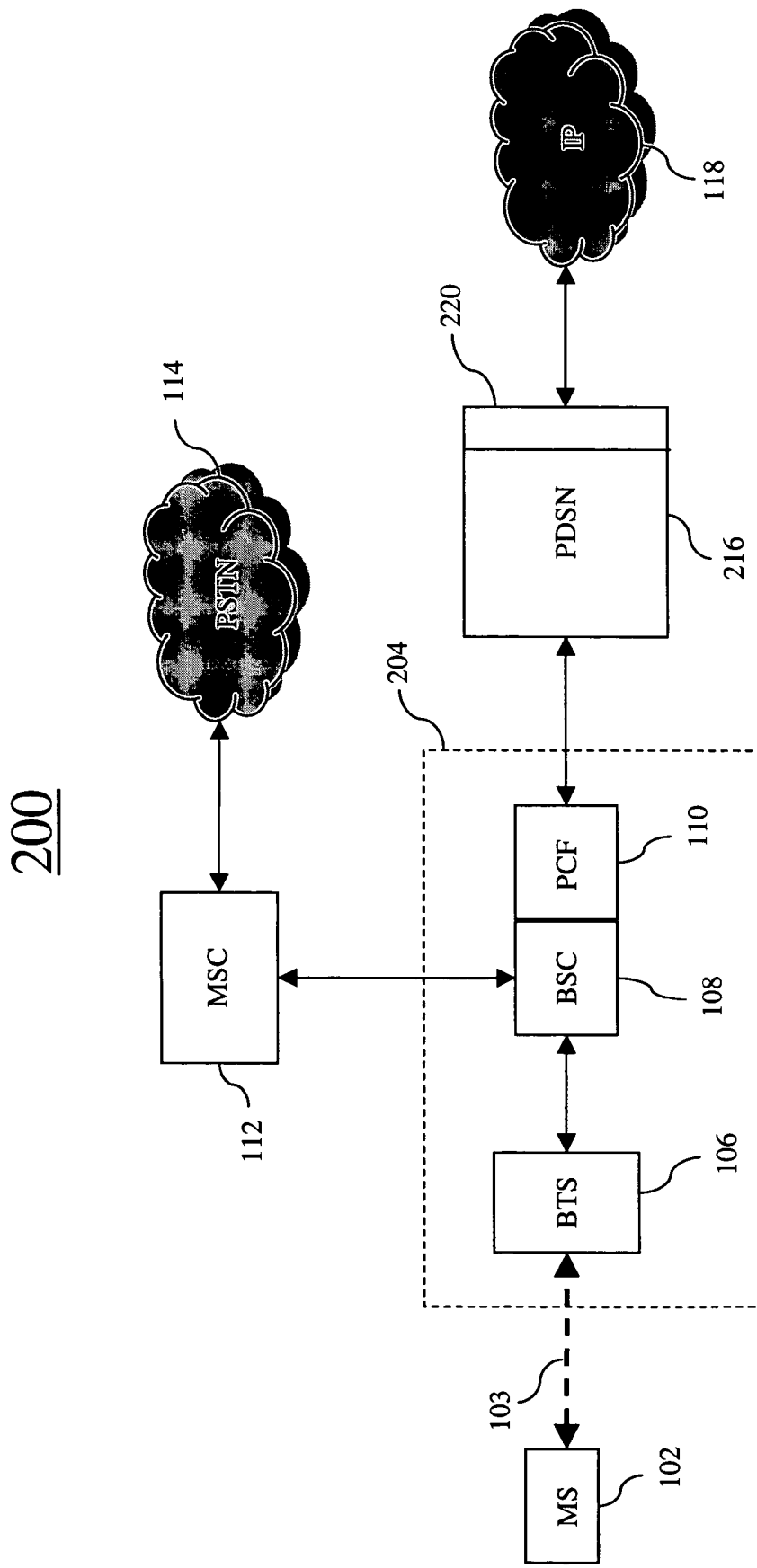
FIG. 2 is a simplified illustration of one embodiment of a wireless communication system 200 in which a packet filter is implemented according to the principles of the present invention.

FIG. 2 is a simplified illustration of one embodiment of a wireless communication system 200 in which a packet filter is implemented according to the principles of the present invention. Wireless communication system 200 is substantially similar to wireless communication system 100 shown in FIG. 1 and described above, except that PDSN 216 also includes a packet filter 220 which operates according to the invention as described below. Additionally, as explained in greater detail below, RAN 204 of FIG. 2 is different from RAN 104 in that is has been modified to be able to detect certain packet markings used to indicate that whether a packet should be sent to MS 102 using a special data channel rather than by establishing an RF circuit to MS 102.

The packet filter 220 according to the present invention in PDSN 216 may be either a static (stateless) packet filter or a stateful packet filter. Static packet filters have a static configuration based on which packets are, on an individual basis, either allowed or denied through the filter. For example, a static packet filter may accept or reject all packets originating from a particular source address or all packets being sent to a particular destination address. Additionally, for example, all packets of a certain protocol type may be either allowed to pass or rejected by a static filter. Stateful packet filters, on the other hand, maintain a state about a flow and utilize this state along with the packet headers to determine packet access/denial. In other words, stateful packet filters remember the past history of packet transmissions, and determine whether to permit or deny current packets in part based on this history.

As mentioned above, packet filtering according to the principles of the present invention is at least in part based on RF circuit state information. For example, according to a first embodiment of the present invention, packet filtering in the to-MS direction is provided that takes into account, in place of or in addition to traditional filtering criteria, whether an RF circuit is already established for a given MS 102. In other words, packet filter 220 is used to either permit or deny the passage of a packet from IP network 118 to MS 102 in part based on whether there is already an established RF circuit between MS 102 and RAN 104 over which the packet may be sent. It will be understood that the information regarding whether an RF circuit is currently established for MS 102 may be provided to PDSN 216—and thus made available to packet filter 220—using, for example, the Third Generation Partnership Project 2 (3GPP2) defined A11 protocol (which carries indicators indicative of when an airlink has become active or taken dormant). For example, in a 1X Radio Transmission Technology (1xRTT) or a 1X Enhanced Voice-Data Only Radio Transmission Technology (1XEV-DO) network, PCF 110 sends an A11 Registration Request packet containing an airlink 103 status update attribute each time an RF channel is assigned/de-assigned for MS 102. In turn, this enables PDSN 216 to maintain a state variable as to how much bandwidth (with regard to airlink 103) is currently allocated for a given MS 102. As explained above, when no bandwidth is allocated for MS 102, the session is said to be dormant, while the session is said to be active when at least some bandwidth is allocated for MS 102. Proprietary signaling messages can be passed between PCF 110 and PDSN 216 to provide aggregate RF usage information for each radio sector controlled by the BTS 106 and BSC 108 associated with each PCF 110.

Selective passing of packets in the manner described above may be desirable, for example, to prevent the activation of an RF circuit simply to allow a ping packet or ICMP echo request (whether sent maliciously or not) to reach MS 102 when dormant. In this manner, it may be possible to prevent or at least substantially reduce the effects of an attack (e.g., a denial of service attack) on a wireless carrier's network where one or a small number of packets are sent to a large number of mobile subscribers (such as MS 102) over a relatively short period of time, something which might otherwise result in wasted RF resources and adversely affect both data and voice service. Moreover, rather than simply blocking all such packets in the to-MS direction, as traditional packet filters may be designed to do, it is possible to permit such packets to pass through packet filter 220 when an RF circuit is already established for an MS 102. Similarly, for example, it may be desirable to allow packets to activate dormant sessions when sufficient RF resources are available.

It will be understood by persons versed in the art that, as with the other packet filtering "rules" described below, the filter rules based on whether an RF circuit is already established may be used alone or in combination with traditional rules (e.g., based on source and destination address, port numbers, protocol type, protocol flags, etc.), or other circuit state information based rules as described herein, in determining whether to prevent or allow the sending of one or more packets to MS 102.

Figure 3:
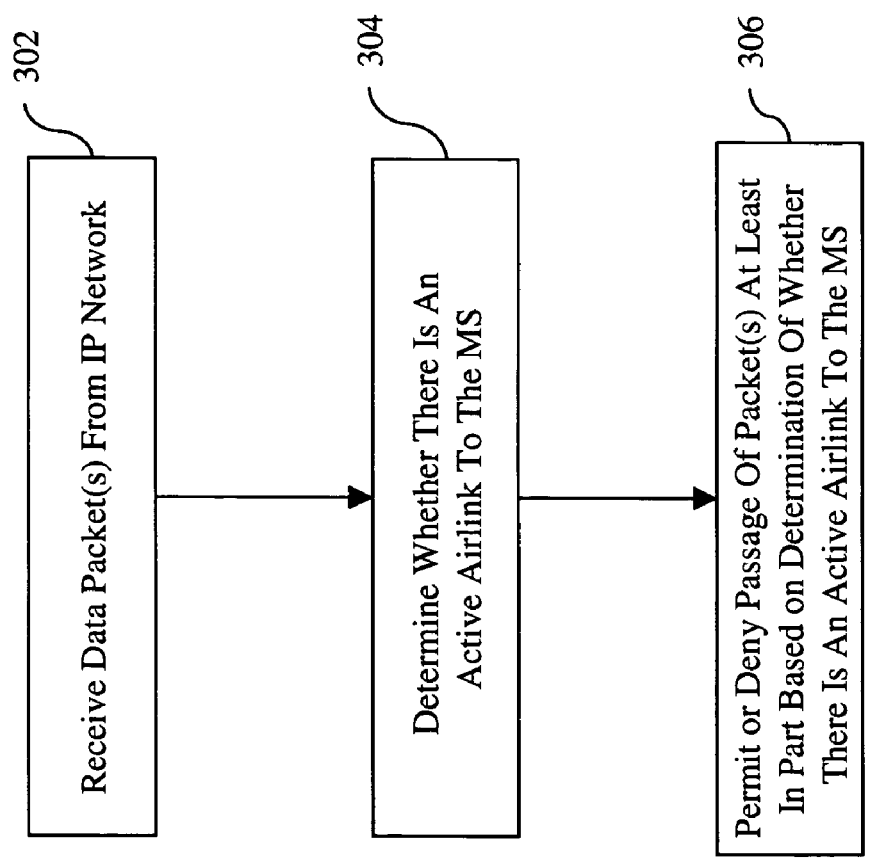
FIG. 3 is a simplified flow chart illustrating the steps performed by a packet filter implemented according to one embodiment of the present invention.

FIG. 3 is a simplified flow chart illustrating the steps performed by packet filter 220 according to the first embodiment described above in either permitting or denying the transmission of one or more packets from IP network 118 to MS 102. In step 302, one or more packets are received from IP network 118. Next, in step 304, it is determined whether there is an active airlink (RF circuit connection) to MS 102. Taking the determination made at step 304 into consideration, the packets are either prevented or allowed from being sent to MS 102 at step 306.

According to another embodiment of the present invention, packet filtering in the to-MS direction is provided that takes into account, in place of or in addition to traditional filtering criteria, whether more than a predetermined number of circuit state transitions (i.e., transitions from an established RF circuit to no RF circuit, and vice versa) have occurred for MS 102 within a predetermined, past period of time. In other words, packet filter 220 may be used to either permit or deny the passage of one or more packets from IP network 118 to an MS 102 when there has been what may be deemed to be an excessive number of set-ups and tear downs of RF circuits in connection with MS 102 within a certain past period of time. For example, packet filter 220 may be configured to permit only one ping per hour which results in an RF circuit being established to an otherwise dormant MS 102.

Figure 4:
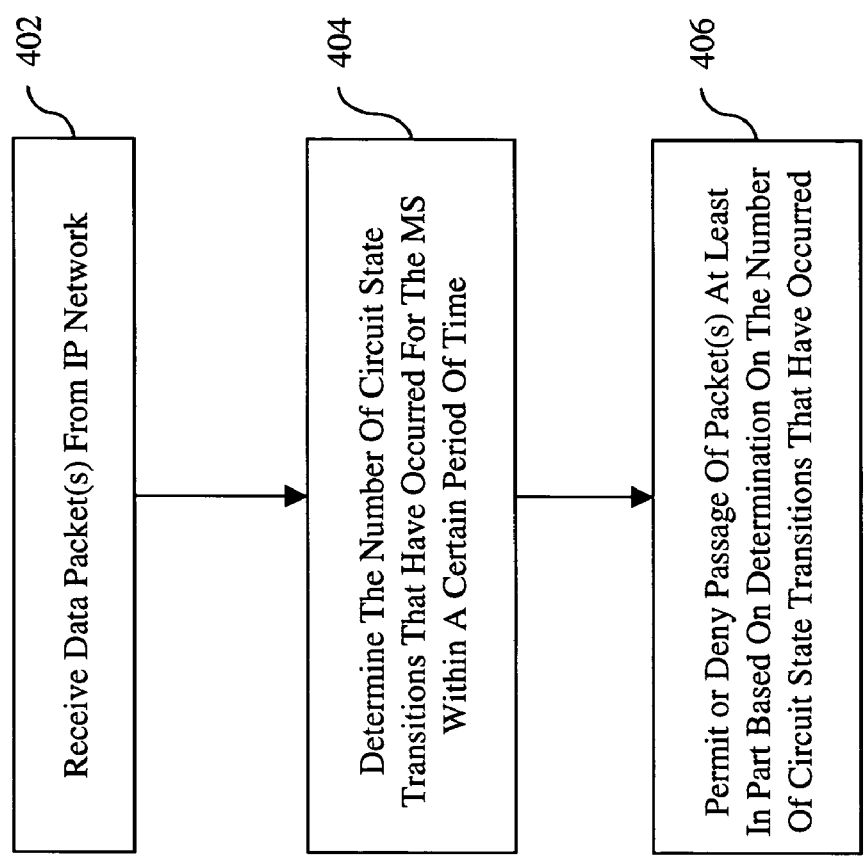
FIG. 4 is a simplified flow chart illustrating the steps performed by a packet filter implemented according to another embodiment of the present invention.

FIG. 4 is a simplified flow chart illustrating the steps performed by packet filter 220 according to this embodiment of the present invention. In step 402, one or more packets are received from IP network 118. Next, in step 404, the number of circuit state transitions occurring over a predetermined past period of time is determined. Additionally, this number of transitions is compared to a predetermined number of transitions which serves as a reference point. Then, at step 406, the determination made at step 404 is taken into consideration, and the one or more packets are either permitted or denied from being sent to MS 102.

While a comparison to a single predetermined number of circuit state transitions is explained above, it will be understood that packet filter 220 may be configured to compare the number of circuit state transitions, occurring during a certain past period of time, to more than one reference number of transitions. For example, two predetermined transition reference numbers may be established. In this case, for example, all packets destined for MS 102 may be allowed to pass when the number of transitions is smaller than (or, in some embodiments, equal to) the smaller of the two reference numbers, and all packets may be denied when the number of transitions is greater than (or, in other embodiments, equal to) the larger of the two reference numbers. Additionally, for example, other factors (or rules) may be used to decide whether to permit or deny packets to MS 102 when the number of transitions is between the first and second predetermined number of transitions. Moreover, the significance of past circuit state transitions may be lessened (or eliminated) in any case when packet filter 220 recognizes that an RF circuit is established over which data can be transmitted without any significant amount of additional overhead.

According to a third embodiment of the present invention, packet filtering in the to-MS direction is provided that takes into account, in place of or in addition to traditional filtering criteria, the percentage, or the total amount, of available RF resources within a radio site (e.g., the entire area covered by BTS 106, one sector of BTS 106, etc.) that are currently in use. In other words, packet filter 220 considers how much of a wireless carrier's RF resources are currently in use when deciding whether to permit or deny packets to MS 102. In this manner, for example, packet filter 220 may decide to allow all packets to reach MS 102, even when doing so would require establishing an RF circuit, if doing so is not likely to cause network problems.

Figure 5:
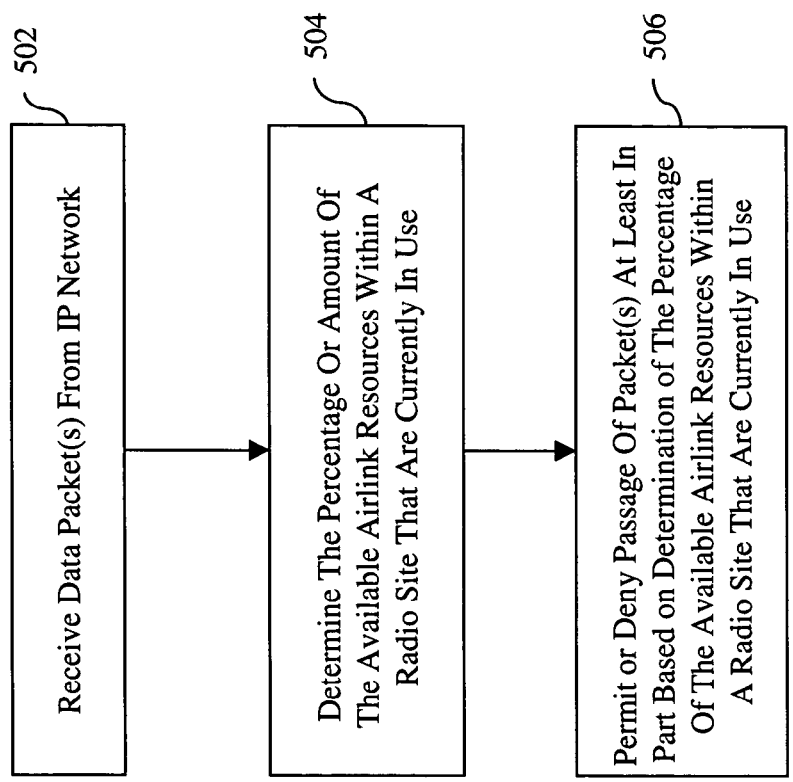
FIG. 5 is a simplified flow chart illustrating the steps performed by a packet filter implemented according to yet another embodiment of the present invention.

FIG. 5 is simplified a flow chart illustrating the steps performed by packet filter 220 according to this embodiment of the present invention. In step 502, one or more packets are received from IP network 118. Next, in step 504, the percentage, or total amount, of available RF resources that are already in use within a radio site is determined. Then, at step 506, the determination made at step 504 is taken into consideration, and the packets are either prevented or permitted or denied from being sent to MS 102.

According to yet another embodiment of the present invention, packet filtering in the to-MS direction is provided that takes into account, in place of or in addition to traditional filtering criteria, the amount of time that the airlink to MS 102 has been dormant. For example, packet filter 220 may use a timer (internal or external) to determine how long the RF circuit connection to MS 102 has been inactive, recognizing that allowing a single packet to be sent to MS 102 during a dormant state would require an RF circuit to be reestablished (i.e., the dormant RF link must be brought back up). Then, based on the time period of dormancy, packet filter 220 can either permit or deny the packets to reach MS 102.

Figure 6:
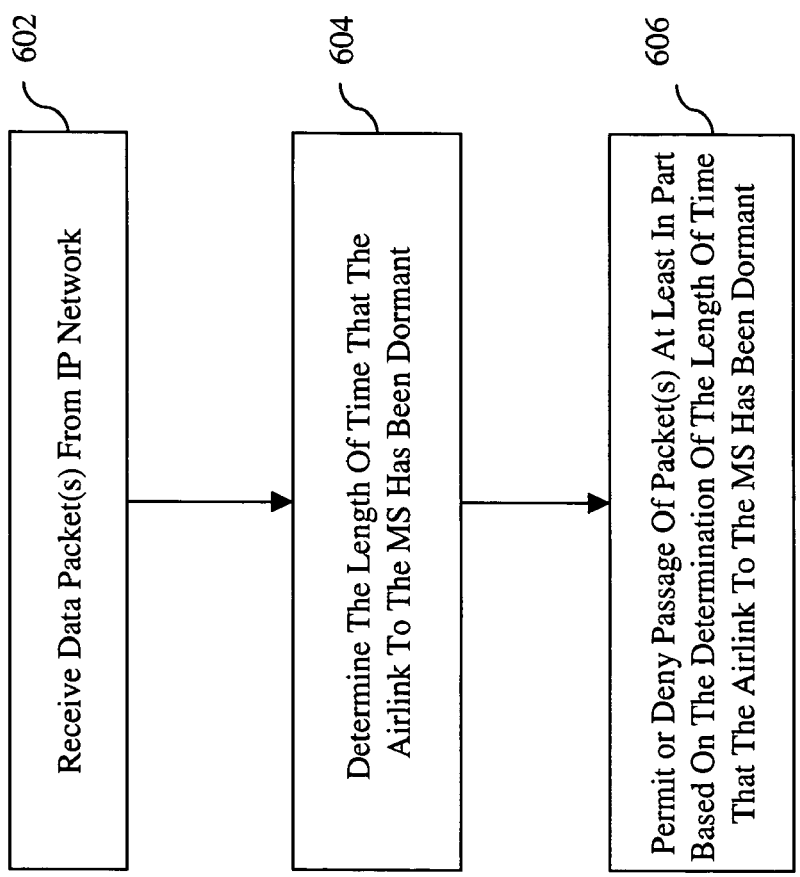
FIG. 6 is a simplified flow chart illustrating the steps performed by a packet filter implemented according to still another embodiment of the present invention.

FIG. 6 is a simplified flow chart illustrating the steps performed by packet filter 220 according to this embodiment of the present invention. In step 602, one or more packets are received from IP network 118. Next, in step 604, the time period that the connection to MS 102 has been dormant is determined. Then, at step 606, the determination made at step 604 is taken into consideration, and the packets are either permitted or denied from being sent to MS 102.

According to a fifth embodiment of the present invention, packet filtering in the to-MS direction is provided that may cause one or more packets to be sent via a special data channel (e.g., using CDMA Short Data Burst (SDB)) when it is determined that MS 102 is dormant, rather than requiring the allocation of dedicated RF resources to the session and then sending the one or more packets over the newly established RD circuit. As known by persons versed in the art, various access technologies are able to send data without bringing up a dedicated RF channel for MS 102. For example, in CDMA 1xRTT and CDMA 1XEV-DO technologies, short data bursts may be sent using a special data channel without establishing an RF circuit. However, when the RF link to MS 102 is dormant and one or more packets arrive at a traditional RAN (e.g., RAN 104), the equipment is not able to inspect the packets or otherwise determine whether the packets are a single or a few packets that should be sent via a special data channel, or packets from a larger group of packets that should be sent via a reestablished RF circuit. Therefore, according to the principles of the present invention, packet filter 220 may be used to mark a chosen packet or packets in such a manner that the downstream RAN 104 will recognize that the packet or packets are suitable to be sent via a special data channel. It will be understood that, regardless of whether the packet or packets are deemed suitable for transmission via a special data channel, they may nonetheless be denied from reaching MS 102 or they may be sent via a reestablished RF circuit. As with the other circuit state information based rules described above, the determination of whether MS 102 is dormant, and whether a special data channel may be used to transmit one or more packets, may be used in combination with other traditional filtering rules or other circuit state information rules as described herein.

The marking of appropriate packets as suitable for transmission using special data channels may be accomplished in many different ways depending on the particular type of access technology that is being used, such as PDSN or gateway general packet radio service (GPRS) support node (also know as GGSN). As an example, when using the A11 protocol to set up an A10 tunnel over which all the data associated with MS 102 is routed (which is known in the art), the IP header can be marked to indicate to RAN 204 that this data is appropriate for a short data burst. Additionally, for example, the GRE header (or other payload encapsulation header) of the packets can be toggled or otherwise marked to similarly provide such an indication to RAN 204. In both of these examples, RAN 204 is programmed to look for the markings just described. The invention is not, however, limited by this particular manner of marking, as the same or a similar result can be achieved using different methods for the same or different access technologies.

Figure 7:
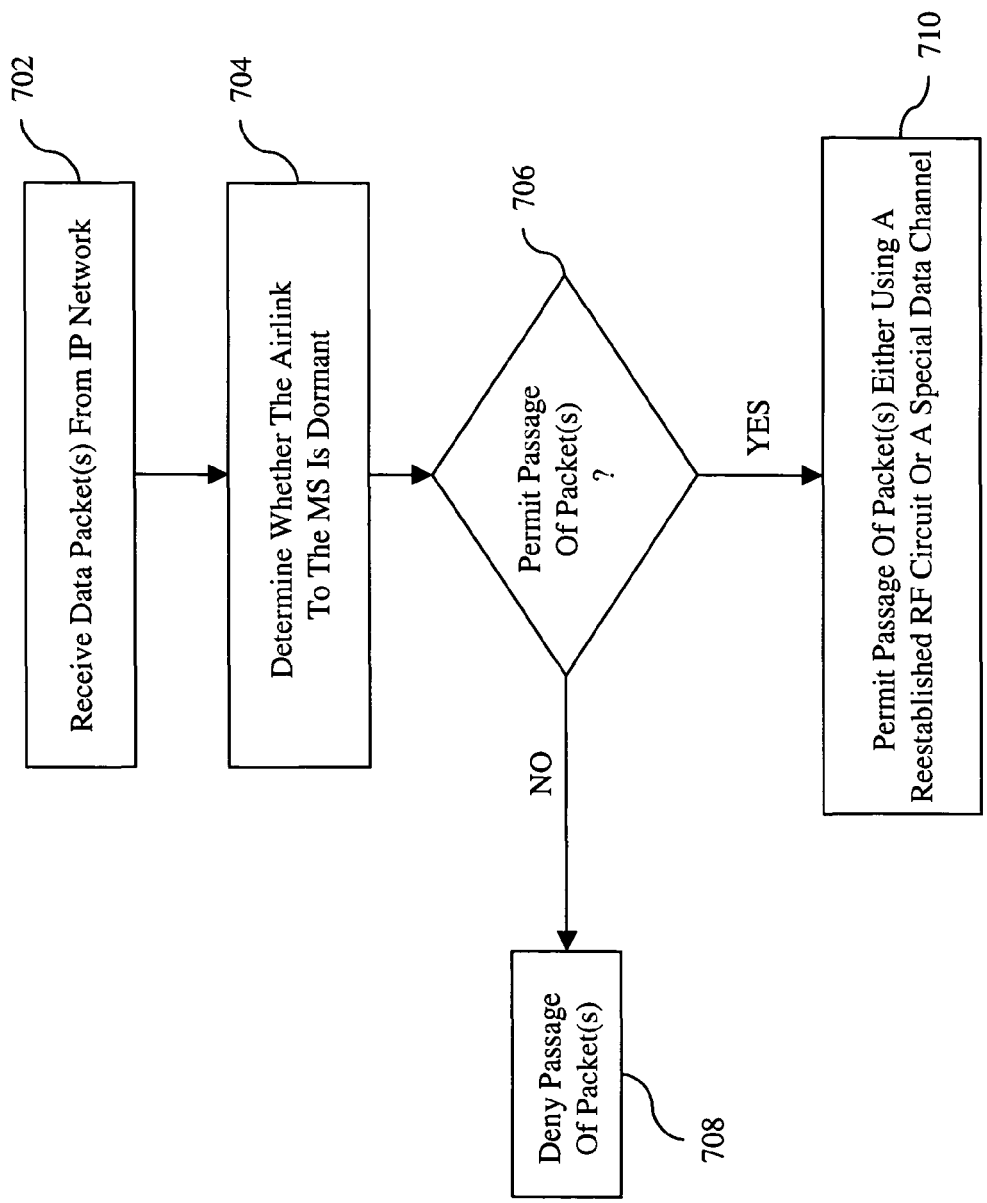
FIG. 7 is a simplified flow chart illustrating the steps performed by a packet filter implemented according to an additional embodiment of the present invention.

FIG. 7 is a simplified flow chart illustrating the steps performed by packet filter 220 according to this embodiment of the present invention. In step 702, one or more packets are received from IP network 118. Next, in step 704, it is determined whether the airlink to MS 102 is dormant using any suitable method. If the airlink to MS 102 is determined to be dormant, at step 706, it is determined whether the packets should be permitted or denied from being sent to MS 102. As explained above, this determination is made using any of many different types of packet filtering rules and criteria. If it is determined that the packets should not be permitted from being sent to MS 102, at step 708, the packets are blocked (e.g., dropped) from being sent to MS 102. On the other hand, if it is determined at step 706 that the packets should be permitted to be sent to MS 102, at step 710, the packets are either sent using either a reestablished RF connection or a special data channel in accordance with the principles of the present invention.

Figure 8:
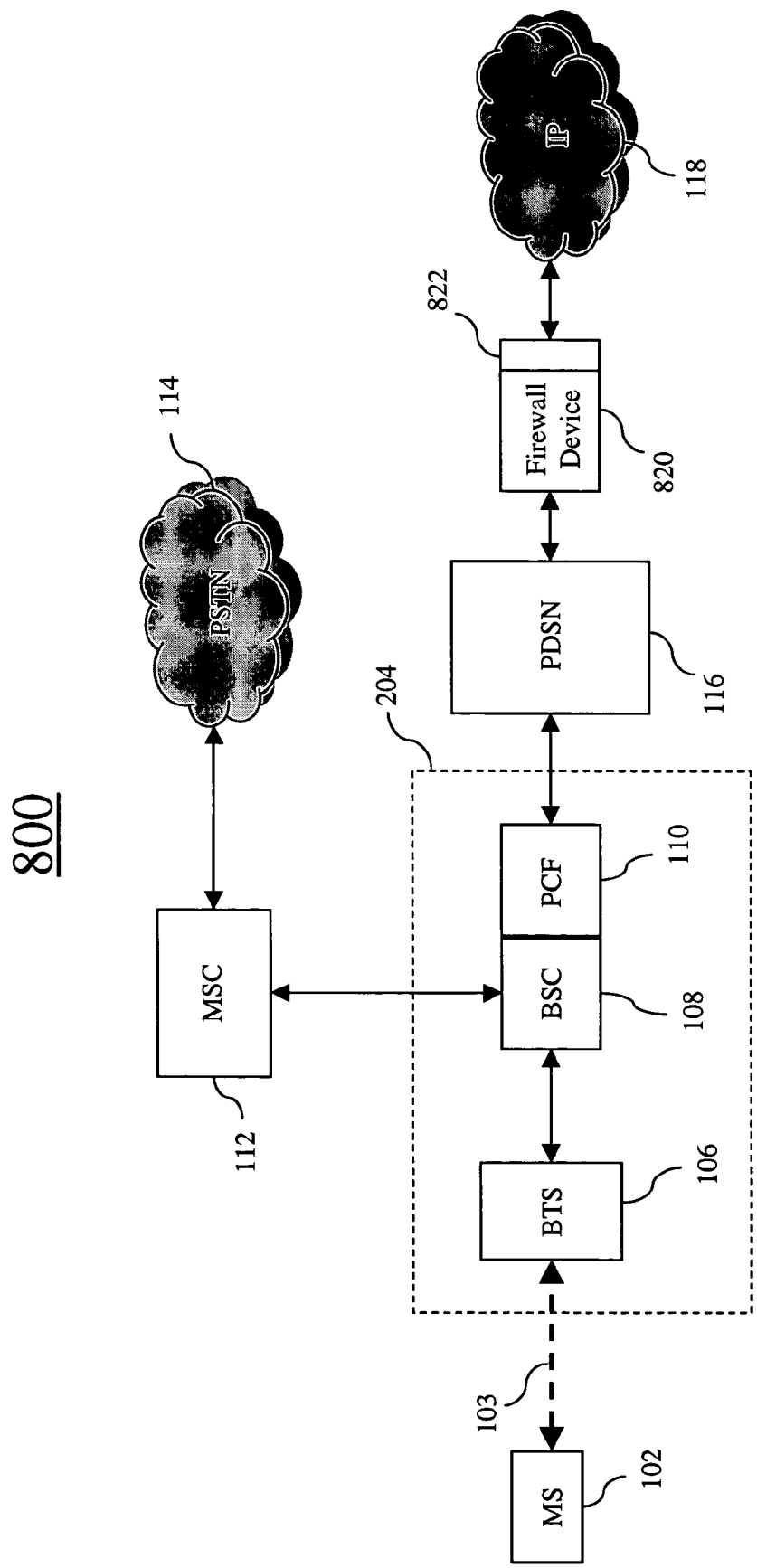
FIG. 8 is a simplified illustration of another embodiment of a wireless communication system 800 in which a packet filter is implemented according to the principles of the present invention.

Persons versed in the art will appreciate that a packet filter according to the invention can be implemented in manners other than the one shown in FIG. 2 and described above. For example, instead of including such a packet filter within a PDSN, as is the case in wireless communication system 200 shown in FIG. 2, a separate firewall device may be used that includes such a packet filter. For example, FIG. 8 is a simplified illustration of one embodiment of a wireless communication system 800 which is substantially similar to system 200 of FIG. 2, except that there is a firewall device 820 that includes a packet filter 822, instead of the PDSN. It will be understood that the various "rules" based on circuit state information principles of the present invention and described above are also applicable to wireless communication systems such as system 800. Moreover, in this case of wireless communication system 800, it will be understood that packet filter 822 of firewall device 820 is provided with the relevant RF circuit state information from, for example, PDSN 116. Alternatively, packet filter 822 may infer the RF circuit state information (e.g., whether there is an established RF circuit for MS 102) using, for example, an idle timer associated with MS 102. In this manner, packet filter 822 would be able to determine how long it has been since data was sent to or received from MS 102, and thereby infer whether an RF circuit is currently established.

Although the invention has been described and illustrated in the foregoing illustrative embodiments, it is understood that the present disclosure has been made only by way of example, and that numerous changes in the details of implementation of the invention can be made without departing from the spirit and scope of the invention. For example, it will be understood that although the invention has been described with particular reference to PDSNs 116 and 216, the invention is not limited in this manner. Rather, the invention may be used for any type of radio device where RF circuits are dynamically brought up and torn down. For example, as mentioned above, the invention may also be used with GGSNs, as well as other types of known access devices, or network access servers (NASs).

Moreover, while emphasis has been placed above on filtering packets in the to-MS direction, it will be understood that the invention is not limited in this manner. It particular, while it is generally desirable to permit all packets originating at and sent from MS 102 to pass to their destination (given that such occurrences translate into billable events), packet filtering as described above may nonetheless be used in filtering packets being sent by MS 102.

Persons versed in the art will also appreciate, for example, that the various filtering "rules" based at least in part on RF circuit state information may be used in combination with one another rather than in isolation. Additionally, while the wireless communication systems described above use only a single packet filter according to the invention, this is not a requirement. Rather, multiple packet filters may be used according to the invention, where some or all of the packet filters are capable of using RF circuit state information in deciding whether to permit or deny the passage of one or more packets to a mobile subscriber. The present invention is limited only by the claims which follow.

What is claimed is:

1. A wireless communication system comprising:

A network access server (NAS) for providing an interface between a radio access network (RAN) and an internet protocol (IP) network; and a data packet filter for selectively permitting the passage of a data packet on an individual packet basis from the IP network to the RAN at least in part based on information regarding the data packet and on radio frequency (RF) data channel state information concerning the state of an RF data channel for transferring data between a mobile subscriber (MS) and the RAN using an airlink, wherein the state of the RF data channel includes a dormant state and an active state:
wherein the dormant state includes when the RF data channel is not established to the MS, and
wherein the active state includes when there is an established RF data channel for transferring data between the MS and the RAN,
wherein the data packet filter causes the passage of the data packet when the RF data channel is determined to be in the active state and the data packet filter selectively passes or inhibits the data packet based on information regarding the data packet when the RF data channel is determined to be in the dormant state.

2. The wireless communication system of claim 1, further comprising a RAN that comprises a base transceiver station (BTS), a base station controller (BSC), and a packet control function (PCF).

3. The wireless communication system of claim 2, wherein the BSC and the PCF are co-located.

4. The wireless communication system of claim 1, wherein the NAS is a packet data service node (PDSN).

5. The wireless communication system of claim 1, wherein the NAS is a gateway general packet radio service support node (GGSN).

6. The wireless communication system of claim 1, wherein the data packet filter includes a static packet filter and the information regarding the data packet includes at least one of address information and protocol type.

7. The wireless communication system of claim 1, wherein the data packet filter denies the passage of the data packet from the IP network to the RAN when an RF data channel is not currently established in connection with the MS.

8. The wireless communication system of claim 1, wherein the state of the RF data channel comprises information regarding the amount of time that the MS has been RF-dormant.

9. The wireless communication system of claim 1, wherein the data packet filter is located within the NAS.

10. The wireless communication system of claim 1, wherein the data packet filter is located within a firewall device.

11. The wireless communication system of claim 10, wherein the data packet filter is located in the data path between the IP network and the NAS.

12. A wireless communication system comprising:
a network access server (NAS) for providing an interface between a radio access network (RAN) and an internet protocol (IP) network, wherein the RAN communicates with mobile subscribers (MS) using a radio frequency (RF) connection; and
a data packet filter for selectively permitting the passage of a data packet from the IP network to the RAN at least in part based on filtering criteria including information regarding the data packet that is obtained from the data packet in the data packet filter and on a determined usage of available radio frequency (RF) resources in the RAN based on information made available to the data packet filter in the wireless communication system for a particular mobile subscriber (MS) to which the data packet is destined including a percentage of available radio frequency (RF) resources that are currently in use at a radio site that communicates with the RAN using an RF connection on an airlink, wherein state information comprises an inactive state when sending a packet to the MS requires the reestablishment of an RF data channel and an active state when there is an allocated RF data channel for transferring data between the MS and the RAN.

13. The wireless communication system of claim 12, further comprising a RAN that comprises a base transceiver station (BTS), a base station controller (BSC), and a packet control function (PCF).

14. The wireless communication system of claim 12, wherein the NAS is a packet data service node (PDSN).

15. The wireless communication system of claim 12, wherein the NAS is a gateway general packet radio service support node (GGSN).

16. The wireless communication system of claim 12, wherein the data packet filter denies the passage of the data packet from the IP network to the RAN when the total number of available RF resources that are being used is above a predetermined number.

17. The wireless communication system of claim 12, wherein the data packet filter is located within the NAS.

18. A wireless communication system of at least one network access server and at least one data packet filter comprising:
a network access server (NAS) for providing an interface between a radio access network (RAN) and an internet protocol (IP) network, wherein the RAN communicates with mobile subscribers (MS) using a radio frequency (RF) connection to allow data packets to be communicated with mobile subscribers; and
a data packet filter configured to selectively mark data packets based on filtering criteria including information in the data packets that is obtained from the data packet in the data packet filter, based on a percentage of available radio frequency (RF) resources that are currently in use at a radio site, and based on state information regarding the MS including when the MS is RF-dormant and configured to permit the passage of a data packet from the IP network to the RAN, the marking resulting in the data packet being sent to a mobile subscriber (MS) using a special data channel, wherein the state information comprises an inactive state when sending a packet to the MS requires the reestablishment of an RF data channel and an active state when there is an allocated RF data channel for transferring data between the MS and the RAN.

19. The wireless communication system of claim 18, wherein the RAN recognizes the marking on the data packet and on the basis of the marking places the marked data packet on the special data channel.

20. The wireless communication system of claim 18, wherein the special data channel is a code-divisional multiple access (CDMA) short data burst channel.

21. The wireless communication system of claim 18, wherein the marking is performed by altering the IP header of the data packet.

22. The wireless communication system of claim 18, wherein the marking is performed by toggling the GRE header of the data packet.

23. A method for filtering data packets at a network access server (NAS) that is in communication with a radio access network (RAN) and an internet protocol (IP) network, the method comprising:
receiving one or more data packets destined for a mobile subscriber (MS) from the IP network;
determining radio frequency (RF) data channel state information concerning the state of an RF data channel on an airlink for transferring data between the MS and the RAN; and permitting or denying the passage of the one or more packets from the IP network to the MS based at least in part based on information regarding the one or more packets and on the determined RF data channel state information, wherein the packet is denied passage when the RF data channel is in an inactive state and the information regarding the packet meets the packet filter criteria, and wherein the packet is permitted passage when the RF data channel is in an active state, which is when there is an established RF data channel for transferring data between the MS and the RAN.

24. The method of claim 23, wherein the determining comprises obtaining information regarding whether an RF data channel is currently established over an airlink in connection with the MS and if an RF data channel is not established, marking the one or more data packets to send over a special RF data channel.

25. The method of claim 23, wherein the permitting or denying comprising permitting the passage of the data packet from the IP network to the RAN when an RF data channel is currently established in connection with the MS and in an active state.

26. The method of claim 23, wherein the permitting or denying comprising denying the passage of the data packet from the IP network to the RAN when no RF data channel is currently established in connection with the MS.

27. The method of claim 23, wherein the determining comprises obtaining information regarding the amount of time that the RF data channel with the MS has been idle.

28. A data packet filter for use in a wireless communication system, the data packet filter receiving one or more data packets from an internet protocol (IP) network and, based at least in part on information regarding the one or more packets, on a percentage of available radio frequency (RF) resources that are currently in use at a radio site, and on radio frequency (RF) data channel state information concerning the state of an RF data channel for transferring data over an airlink between a mobile subscriber (MS) and a radio access network (RAN), permitting or denying the passage of the one or more packets from the IP network to the MS, wherein the RF data channel state information comprises an inactive state when sending a packet to the MS requires the reestablishment of the RF data channel and an active state when there is an allocated RF data channel for transferring data between the MS and the RAN.

29. The data packet filter of claim 28, wherein the data packet filter determines when the RF data channel is dormant and marks the one or more data packets for transmission to the MS using a special data channel.

30. The data packet filter of claim 28, wherein the data packet filter receives the RF data channel state information from an access device.

31. A wireless communication system comprising:
an access device for providing an interface between a radio access network (RAN) and an internet protocol (IP) network;
the interface with the RAN receiving an indication of the state of an RF connection regarding whether the RF connection is established on an airlink between a mobile subscriber (MS) and the RAN for transferring data; and
a data packet filter for selectively permitting the passage of a data packet from the IP network to the RAN at least in part based on information regarding the data packet, on a percentage of available radio frequency (RF) resources that are currently in use at a radio site, and on RF connection state information, wherein RF connection state information comprises an inactive state when sending a packet to the MS requires the reestablishment of an RF data channel and an active state when there is an allocated RF data channel for transferring data between the MS and the RAN.

32. The wireless communication system of claim 31, wherein the access device maintains a state variable as to how much bandwidth is allocated at a given time for a particular MS.

33. The wireless communication system of claim 31, wherein the data packet filter is configured to send the packets using a reestablished RF connection or a special data channel.

34. The wireless communication system of claim 31, wherein the RF connection state information comprises a dormant state when sending a packet to the MS requires the reestablishment of the RF connection and an established state when there is an allocated RF connection for transferring data between the MS and the RAN.

35. The wireless communication system of claim 31, wherein the data packet filter is located within the access device.

36. Logic encoded on a non-transitory medium that when executed configured to:
receive one or more data packets destined for a mobile subscriber (MS) from the IP network;
determine radio frequency (RF) data channel state information concerning the state of an RF data channel on an airlink for transferring data between the MS and the RAN; and
permit or deny the passage of the one or more packets from the IP network to the MS based at least in part based on information regarding the one or more packets and on the determined RF data channel state information, wherein the packet is denied passage when the RF data channel is in an inactive state and the information regarding the packet meets the packet filter criteria, and wherein the packet is permitted passage when the RF data channel is in an active state, which is when there is an established RF data channel for transferring data between the MS and the RAN.

37. The logic of claim 36, wherein the permitting or denying comprising permitting the passage of the data packet from the IP network to the RAN when an RF data channel is currently established in connection with the MS and in an active state.

38. The logic of claim 36, wherein the permitting or denying comprising denying the passage of the data packet from the IP network to the RAN when no RF data channel is currently established in connection with the MS.

* * * * *